United States Patent

[11] 3,607,818

[72] Inventors Michael P. Trubisky
Fairport, N.Y.;
Darrell J. Parish, Circleville, Ohio
[21] Appl. No. 746,761
[22] Filed July 23, 1968
[45] Patented Sept. 21, 1971
[73] Assignee E.I. du Pont de Nemours and Company
Wilmington, Del.

[54] OPAQUE POLYESTER FILM
12 Claims, No Drawings
[52] U.S. Cl. .................................................. 260/33.2 R,
96/87 A, 260/40 R
[51] Int. Cl. .................................................. C08k 1/16
[50] Field of Search ........................................ 260/40;
96/87

[56] References Cited
UNITED STATES PATENTS

| | | | |
|---|---|---|---|
| 3,497,357 | 2/1970 | Wang ........................... | 96/87 |
| 3,072,483 | 1/1963 | Trevoy et al. .................. | 96/87 |
| 3,340,062 | 9/1967 | Hunter et al. .................. | 96/84 |

OTHER REFERENCES

Kirk-Othmer Encyclopedia of Chemical Technology, A. Standen, Exec. ed. Vol. 4, 2nd Ed., John Wiley & Sons, Inc. New York, 1964, pages 254 & 255.

*Primary Examiner*—Morris Liebman
*Assistant Examiner*—S. M. Person
*Attorney*—Donald W. Huntly

ABSTRACT: Polyester film suitable for support of photosensitive coatings rendered opaque by incorporation of carbon black and adherable by flame treatment.

OPAQUE POLYESTER FILM

Background of the Invention

Self-supporting films formed of linear polyesters, particularly those which are predominately the reaction product of ethylene glycol and terephthalic acid, possess desirable mechanical and chemical properties for the production of photographic films. Such base materials, however, are highly hydrophobic, and when used as photographic bases, the usual water-based silver halide emulsions do not readily adhere to the base film. It has heretofore generally been necessary to provide at least one anchoring layer between the film and the emulsion layer. If an opaque base is required, as is the case with self-developing cameras, opacifying material is often supplied in a coating layer, as in Morgan, U.S. Pat. No. 3,021,229. The above techniques, however, increase the number of coating layers which must be applied to the base film in addition to the photosensitive layers, and are consequently cumbersome and costly.

Attempts have previously been made to circumvent the application of one of these layers by incorporating an opacifying pigment into the thermoplastic film. For example, in Canadian Pat. No. 734,566, incorporation of a carbon black of relatively high surface area is proposed. The resulting product, however, while sufficiently opaque, does not have the smooth surface which is required for use in photographic film. The surfaces of the films prepared according to the Canadian process have visible blemishes which result in defects in the photographic image.

SUMMARY OF THE INVENTION

The instant invention relates to film which is convenient to produce and does not require separate coatings for adhesion and opacification. Specifically, the instant invention provides a molecularly oriented linear polyester film having incorporated therein about from 2 to 12 percent carbon black particles which are substantially all below 10 microns in size and have a surface area of less than about 18 square meters per gram. Preferably the film has an absorbance of at least 8. It is also preferred that the film exhibit a contact angle with water of less than 75° and have an adhesion of less than 2.0 as measured by the Gelatin Adhesion Test.

DESCRIPTION OF THE PREFERRED EMBODIMENTS

Linear polyesters which can be used in the instant invention are the condensation polymerization product of various glycols and acids or esters. The intrinsic viscosity, as measured in a 60/40 mixture of tetrachloroethane/phenol at 30° C. should be greater than about 0.4 and preferably greater than about 0.5.

Glycols which can be used in the formation of linear polyesters for films of the instant invention include those having the general formula $C_nH_{2n+2}O_2$ wherein $n$ is an integer of from one to 10. Such glycols include, for example, polymethylene glycols such as ethylene glycol, propylene glycol, tetramethylene glycol, pentamethylene glycol, hexamethylene glycol and decamethylene glycol; branched chain glycols such as 2,2-dimethyl-1,3-propanediol and 2-methyl, 2-ethyl, −1,3-propanediol; glycols containing a cycloalkyl ring such as 1,4-cyclohexane dimethanol and 2,2-bis[4-(beta hydroxyethoxy) phenyl] propane. Preferred glycols include ethylene glycol, 1,3-propylene glycol, tetramethylene glycol, 1,4 cyclohexane dimethanol and neopentyl glycol.

Dibasic acids and lower alkyl esters of dibasic acids which can be used in the preparation of films of the instant invention conform to the formula R'OOC-R-COOR' wherein R is selected from naphthyl, biphenyl, cyclohexyl, diphenylmethane, benzophenone and alkylene radicals containing from 1 to 12 carbon atoms and wherein R' is selected from hydrogen, methyl, ethyl, butyl and hydroxyethyl. Examples of preferred dibasic acids include terephthalic acid, isophthalic acid, sebacic acid, adipic acid, 1,5-naphthalic acid, 2,5-naphthalic acid, 2,6-naphthalic acid, 2,7-naphthalic acid, azelaic acid, hexahydroterephthalic acid, and $p,p'$ diphenyl dicarboxylic acids.

Of the polyesters prepared from the foregoing glycols and dibasic acids, those polyesters prepared from ethylene glycol and terephthalic acid have been found to lend themselves to the formation of films whose physical qualities are particularly well suited for photographic films. Especially preferred polyesters contain at least about 85 percent polyethylene terephthalate.

The polymer can include minor constituents such as other aliphatic or aromatic diacids, or diols with from one to 10 methylene groups, neopentyl glycol, or diethylene glycol. It has been found that the inclusion of about from 2 to 5 percent of such copolymer, and especially diethylene glycol, makes the resulting films of the instant invention more responsive to flame treatment. Polyethylene terephthalate film comprising about from 2 to 5 percent copolymer is rendered more adherable with the same flame treatment, for example, than film prepared from pure ethylene glycol and terephthalic acid.

Self-supporting films can be prepared from these polyesters by extruding the molten polymeric material through a suitable orifice followed by quenching the amorphous polymeric material in film form. The film is then molecularly oriented by stretching or rolling at least 1.5 times its original dimension in at least one of the major planar directions of length and width. The oriented and heat-set film possesses a desirable combination of physical properties which includes tensile strength, toughness and dimensional stability.

The physical characteristics of the carbon black incorporation in the film are important aspects of this invention. As indicated above, the particle size of the black used should be such that substantially all of the particles are less than 10 microns in diameter. It is preferred that the mean particle size be less than 2, and that at least 98 percent of the particles be less than 4 microns in diameter. Blacks in which not more than 4 percent of the particles exceed 2 microns have been found especially satisfactory. The term "particle" refers to individual ultimate particles or conglomerates of ultimate particles. The black should also have a surface area of less than about 18 square meters per gram, preferably about from 12 to 18 square meters per gram, and especially 12 to 15 square meters per gram. These blacks render the film satisfactorily opaque and do not agglomerate to cause surface blemishes upon incorporation into the film.

Of the carbon black pigments, lampblack has been found to satisfy the physical requirements indicated above with minimal additional processing, and to be especially satisfactory for incorporation into polyethylene terephthalate films. Suitable lampblack can be prepared by the combustion of hydrocarbon liquid.

The measurement of particle size can be carried out with a Coulter counter using a resolution provided by a 50-micron orifice. Pigment which initially contains too large a proportion of coarse material can be ground by various processes used in the art such as that described in Thomas U.S. Pat. No. 3,275,590.

The quantities of lampblack pigment necessary for opacification of a particular film will vary according to the thickness of the film. In general, however, to provide an optical density in the film product of at least 8, the film having a thickness of about from 3 to 5 mils, about from 2 to 12 percent lampblack is employed.

The opacifying pigment is incorporated in the polymer matrix prior to extrusion through the die. It can be dispersed in a liquid additive such as ethylene glycol and incorporated prior to polymerization. Preferably, however, the pigment is added to the finished polymer just prior to or during the extrusion. In this way the pigment does not affect the polymerization and the same polymerization facility can be used for both pigmented and unpigmented film. The pigment can be dispersed directly alone in the molten polymer, or be coated with dispersion aids such as silicone oils, or combined with polymer chips by direct addition or in the form of a masterbatch.

The pigment can be combined with or added to a polymer with other additives such as extrusion aids, sequestering agents, antistatic agents or inert particles. For example, about from 0.5 to 5.0 percent polyethylene oxide, based on the total weight of the film, when incorporated with the carbon black, substantially improves the antistatic qualities of the film, and, at the same time, aids in the dispersion of the black, thereby reducing the number of asperities in the finished film. The addition of polyethylene oxide is therefore preferred in the preparation of the films of the instant invention. Polyethylene oxides which can be so used include those having a molecular weight of about from 6,000 to 200,000.

The films exhibit an absorbance in excess of 8, as measured by the general formula $$A = \log_{10}(Io/I)$$

wherein $Io$ is the radiant energy with no absorbing film in the light path, the $I$ is the radiant energy passed by the film. Further, despite the presence of up to 12 percent by weight of pigment particles, the film is remarkably smooth and free from surface defects or asperities greater than 10 microns in diameter. A visual inspection of a flat piece of opaque film of the instant invention, illuminated at an oblique angle, shows no surface asperities larger than about from 40 to 50 microns, and less than about 200 asperities per square foot of any size greater than 10 microns.

In order to achieve satisfactory spreading of water-based coatings such as gelatino silver halide emulsions, an average contact angle with water of less than 75°, and especially less than 40°, is desirable. Further, an adhesion rating of less than 2.0, as measured by the Gelatin Adhesion Test described below, is necessary for the satisfactory adherence of photographic emulsions. The average contact angle, the arithmetic average of advancing and receding contact angles, can be measured in accordance with the procedure described in Bryan and Swarts U.S. Pat. No. 3,153,683.

The adhesion of the films can be tested as follows:

5.5 grams of air-dried photographic grade gelatin is added to 95 ml. of cold distilled water and allowed to swell. 0.25 grams of a dye is dissolved in 5 ml. of distilled water together with 3.5 ml. of a 1 percent wetting agent. The dye and gelatin are combined and the mixture is warmed to 35°-40° C. until the gelatin is fully dissolved. Specimens of film about 2 inches × 6 inches are dipped into the gelatin-dye solution and then raised to permit the excess liquid to drain off. After the gelatin has set at room temperature the strip is placed in a 40° C. over for ½hour and allowed to dry. The samples are then allowed to equilibrate at room temperature (72° F. and 45 percent RH) for a period of 4 hours. The coating weight should be 100 to 150 mg./ft.$^2$. The coating is cut with a razor blade five parallel slashes about 1 mm. apart. Five additional slashes are cut at 45° to the first set. Transparent pressure-sensitive cellophane tape is placed across the razor cuts and pressed down firmly, leaving a tab on one end for pulling. The film base is held down firmly with one hand and the pressure sensitive tape ripped up with a snap of the wrist. The adhesion is rated from 0 to 6 depending upon the amount of gelatin removed by the tape. 0 represents no removal and 6 represents complete removal of the gelatin coating with separation on scribing. In terms of weights values 1, 2, and 3 correspond to removal of less than 0.1 mg., 0.1 to 0.2 mg., and 0.2 to 0.6 mg. respectively. The adhesive tape test is applied three times and the sum of the ratings combined to give a scale from 0 to 18.

It has been found that the desired contact angle and adhesion can be obtained by flame treatment according to the general methods and with the apparatus described in Bryan, U.S. Pat. No. 3,145,242, which is hereby incorporated by reference. It has also been found that the opaque films of the instant invention exhibit the unexpected advantage of being significantly more responsive to flame treating than similar films without carbon black incorporated therein. That is, the same flame-treating procedure, when applied to an opaque film of the instant invention, will yield a more adherent product than when applied to a clear film. The flame treatment can be carried out with a gaseous mixture consisting essentially of a hydrocarbon fuel, oxygen and nitrogen. A suitable fuel is a parafinic or olefinic hydrocarbon gas, for example, propane. The ratio of the amount of hydrocarbon fuel present in the gaseous mixture supplied to the burner to the amount of hydrocarbon fuel necessary for complete stoichiometric combustion, or the "fuel equivalence ratio," should be about from 0.8 to 1.3, and preferably about 1.2.

The ratio of the total amount of oxygen present in the gaseous mixture supplied to the burner to the total amount of non-fuel components in the mixture or the "oxygen ratio" can range from 0.250 to 0.290. The distance from the surface of the film to the discharge opening of the burner should be less than the length of the unimpeded primary envelope of the flame but not less than the distance necessary to maintain the flame. The film is led over a thermally conductive surface opposite the flame. The surface is maintained at a temperature within the range from 5° C. to 105° C. The film is exposed to the flame for about from 0.01 to 0.05 seconds.

The following examples illustrate specific embodiments of the instant invention.

Example 1

A commercial lampblack powder is ground in a fluid energy mill. The ground powder is found to have a mean particle size of about 1.3 microns, 0.5 percent being coarser than 3 microns, and a surface area of about 16 square mils per gram.

Molten polyethylene terephthalate polymer of intrinsic viscosity 0.56 is fed from polymerization equipment to a twin-screw extruder at the rate of 200 pounds per hour. A vibrascrew feeder meters the ground lampblack into the polymer at the rate of 12 pounds per hour. The pigmented polymer is filtered through a 200 mesh filter screen and extruded at 285° C. The extruded film is then quenched and stretched biaxially approximately 2.8 times in the machine and in the transverse directions at a temperature of 95° C. The film is then heat-set under restraint at approximately 180° C. The resulting film is examined for asperities, and no asperities greater than 50 microns are present. The number of small asperities is about 20 per square feet. The absorbance is greater than 9, and the film is 3.3 mils thick, the lampblack comprising about 6 percent by weight.

The film is then flame treated, using the apparatus described in Bryan U.S. Pat. No. 3,145,242. The cooled surface of the drum is 40° C. and the oxygen ratio 0.278. The film speed is 300 to 400 feed per minute. The fuel equivalence ratio is varied as indicated in table I. The film is tested for adhesion according to the test described above, and the results are given in table I.

TABLE I

| Fuel equivalence Ratio | Gelatin Adhesion Test | |
|---|---|---|
| | Pigmented Film of Example 1 | Unpigmented Control Film |
| 0.8 | 1.8 | 4.3 |
| 1.0 | 0.6 | 4.7 |
| 1.2 | 0 | 4.0 |
| No Treatment | 18 | 18 |

The results of the Gelatin Adhesion Test represent an average of 10 determinations for the pigmented film and 3 for the control. The water contact angle is less than 40° in all cases of flame treatment.

Example 2

Example 1 is repeated, except that the lampblack is not subjected to the fluid energy milling. The lampblack used contains 6 percent particles coarser than 3 microns. The thickness of the film is 3.3 mils. The absorbance is greater than 9, and the number of asperities is less than 200 per square feet.

Example 3

Example 2 is repeated except that the filter mesh screen is increased to 550 mesh. The number of asperities in the finished film is decreased to a range of from 16 to 40 per square feet. The useful filter life is 10–18 hours as compared to 72 hours with the 200-mesh screen.

Example 4

Molten polyethylene terephthalate polymer of intrinsic viscosity 0.56 from polymerization equipment is fed to an extruder at the rate of 200 pounds per hour. Lampblack and polyethylene oxide are added, and an opaque film is extruded, quenched, stretched and heat-set. The lampblack in the finished film comprises about 5 percent by weight and the polyethylene oxide comprises 2 percent by weight of the film and has a molecular weight of 20,000. The final film thickness is 3.6 mils, the absorbance is 8.4, and the film has about 200 asperities per square foot. The surface resistivity is about $5 \times 10^{13}$ ohms per square.

Example 5

Example 4 is repeated, except that the quantity of polyethylene oxide is increased from 2 percent by weight to 5 percent by weight. The number of asperities in the resulting film is about 125 per square foot, and the surface resistivity is about $10^{13}$ ohms per square.

Example 6–Comparative Example

Example 2 is repeated using a channel-type impingement black, having an average particle diameter of 0.028 micron and a surface area of 295 square meters per gram. The resulting film has greater than 600 asperities per square inch.

Example 7

Film prepared in example 1, flame treated with a fuel equivalent ratio equal to 1.2, is coated with a photosensitive emulsion of the gelatino silver chloride type, which adheres well in both the wet and dry state.

Examples 8, 9, and 10

Example 1 is repeated, except that the film is cast in the thicknesses indicated below, and the pigment comprises 4 percent by weight of the film. The absorbance of the film is measured by the method described in the specification and the results are tabulated below in table II.

TABLE II

| Example | Film Thickness Mils | Absorbance |
|---|---|---|
| 8 | 2 | 5.5 |
| 9 | 3 | 7. |
| 10 | 3.5 | 8. |

Example 11

Two batches of film are prepared and flame treated according to the method described in example 1. The polymer for the first batch is prepared with pure ethylene glycol and the polymer contains less that 2 mol percent of diethylene glycol. The polymer for the second batch is prepared in the same manner but with added diethylene glycol, and the polymer contains 5 mol percent of diethylene glycol. The two films are flame treated at a propane-oxygen ratio of 1.2 and a drum temperature of 30° C. The adhesion, as measured by the Gelatin Adhesion Test is 2 for the first film and 0 for the second.

We claim:

1. A substantially opaque molecularly oriented linear polyester film having incorporated therein about from 2–12 percent carbon black having a surface area of less than about 18 square meters per gram, substantially all of the particles of which are less than 10 microns in size.

2. A polyester film of claim 1 having a contact angle with water of less than 75° and adherence of less than 2.0 as measured by the Gelatin Adhesion Test.

3. A polyester film of claim 1 having been exposed, for a period of about 0.01–0.05 seconds, to a flame of a gaseous mixture consisting essentially of hydrocarbon fuel, oxygen, and nitrogen, the fuel being selected from parafinic and olefinic hydrocarbons, the fuel equivalent ratio being about from 0.8 to 1.3, the oxygen ratio of the gaseous mixture being about from 0.250 to 0.290.

4. A polyester film of claim 1 wherein the polyester comprises at least 85 percent polyethylene terephthalate.

5. A polyester film of claim 4 wherein the polyester further comprises about from 2 to 5 percent diethylene glycol copolymer.

6. A film of claim 1 wherein the carbon black has a surface area of about from 12 to 18 square meters per gram.

7. A polyester film of claim 1 wherein the carbon black consists essentially of lampblack.

8. A polyester film of claim 1 wherein the surface area of the carbon black is about from 12 to 15 square meters per gram.

9. A polyester film of claim 1 further comprising about from 0.5–5 percent polyethylene oxide.

10. A molecularly oriented polyester film consisting of at least 85 percent of polyethylene terephthalate and about 2–12 percent lampblack having an average particle size of less than about 3 microns and surface area of about from 12 to 15 square meters per gram, further comprising about from 0.5–5 percent polyethylene oxide, the film having been subjected to a flame of a hydrocarbon mixture having a fuel equivalent ratio of about 1.2 and an oxygen ratio of about from 0.250 to 0.290 for a period of about from 0.01 to 0.05 seconds.

11. A polyester film of claim 10 coated with a photosensitive emulsion.

12. A polyester film of claim 11 wherein the emulsion is a gelatino silver chloride emulsion.